(12) United States Patent
Lim

(10) Patent No.: US 11,619,163 B2
(45) Date of Patent: Apr. 4, 2023

(54) SUPERCHARGER FOR VEHICLE AND METHOD OF CONTROLLING SAME

(71) Applicant: HYUNDAI MOBIS CO., LTD., Seoul (KR)

(72) Inventor: Seung Taek Lim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/835,372

(22) Filed: Jun. 8, 2022

(65) Prior Publication Data

US 2022/0298959 A1 Sep. 22, 2022

Related U.S. Application Data

(63) Continuation of application No. 17/319,226, filed on May 13, 2021, now Pat. No. 11,384,682.

(30) Foreign Application Priority Data

Jun. 16, 2020 (KR) .......................... 10-2020-0073075

(51) Int. Cl.
*F02B 33/44* (2006.01)
*F02B 37/007* (2006.01)
*F02B 37/013* (2006.01)
*F02B 37/16* (2006.01)

(52) U.S. Cl.
CPC .......... *F02B 33/446* (2013.01); *F02B 37/007* (2013.01); *F02B 37/013* (2013.01); *F02B 37/162* (2019.05)

(58) Field of Classification Search
CPC .... F02B 33/446; F02B 37/162; F02B 37/007; F02B 37/013
See application file for complete search history.

(56) References Cited

U.S. PATENT DOCUMENTS

2006/0059908 A1  3/2006  Schorn et al.
2009/0038309 A1  2/2009  Cocca et al.

FOREIGN PATENT DOCUMENTS

| DE | 10 2004 061 023 A1 | 6/2006 |
|---|---|---|
| DE | 10 2014 007 167 A1 | 6/2015 |
| DE | 10 2015 208 540 A1 | 11/2016 |
| FR | 2 904 365 A1 | 2/2008 |
| WO | WO 2020/250661 A1 | 12/2020 |

*Primary Examiner* — Ngoc T Nguyen
(74) *Attorney, Agent, or Firm* — NSIP Law

(57) ABSTRACT

A supercharger for a vehicle includes: a first compression part to compress outside air; a second compression part to compress the outside air independently of the first compression part; a first valve module to selectively switch a path of the air compressed by the first compression part to a power source of the vehicle or the second compression part and to selectively guide or shut off the air compressed by the second compression part to the power source; and a second valve module to selectively shut off a flow of the air compressed by the first compression part into the second compression part or a flow of the outside air into the second compression part.

12 Claims, 8 Drawing Sheets

SUPERCHARGER FOR VEHICLE AND METHOD OF CONTROLLING SAME

CROSS-REFERENCE TO RELATED APPLICATION

This application is a continuation of U.S. patent application Ser. No. 17/319,226, filed on May 13, 2021, now U.S. Pat. No. 11,384,682 issued on Jul. 12, 2022, which claims priority to and the benefit of Korean Patent Application No. 10-2020-0073075 filed in the Korean Intellectual Property Office on Jun. 16, 2020, the entire contents of which are incorporated herein by reference.

TECHNICAL FIELD

The present disclosure relates to a supercharger for a vehicle and a method of controlling the same, and more particularly, to a supercharger for a vehicle and a method of controlling the same, the supercharger having a simplified structure and being capable of accurately controlling a supercharging condition in accordance with required conditions.

BACKGROUND ART

Vehicles may be provided with various types of superchargers in order to increase the amount of intake air to be introduced into an engine. The superchargers are widely used for gasoline engines as well as diesel engines.

In general, the supercharger includes: a compression part including an impeller; a motor part configured to provide driving power for operating the impeller; and an inverter part configured to control an operation of the motor part.

Meanwhile, a size of the impeller needs to be increased to obtain a high flow rate from the supercharger, but the increase in size of the impeller inevitably causes a problem of an increase in overall size of the supercharger.

Meanwhile, the impeller needs to be rotated at a high speed in order to obtain a high compression ratio from the supercharger, and the impeller needs to have a small size so as to be rotated at a high speed by reducing rotational inertia of the impeller. As a result, there is a problem in that it is difficult to obtain a high flow rate from the supercharger characterized by implementing a high compression ratio.

As described above, in the related art, it is difficult for the single supercharger to implement the high flow rate and the high compression ratio, and thus a plurality of superchargers needs to be used inevitably, which causes a problem of a deterioration in degree of design freedom and spatial utilization and an increase in costs.

Therefore, recently, various studies are conducted to simplify a structure while implementing a high flow rate and a high compression ratio, but the study results are still insufficient. Accordingly, there is a need for development of a technology for simplifying the structure while implementing the high flow rate and the high compression ratio.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a supercharger for a vehicle includes: a first compression part configured to compress outside air; a second compression part configured to compress the outside air independently of the first compression part; a first valve module configured to selectively switch a path of the air compressed by the first compression part to a power source of the vehicle or the second compression part and to selectively guide or shut off the air compressed by the second compression part to the power source; and a second valve module configured to selectively shut off a flow of the air compressed by the first compression part into the second compression part or a flow of the outside air into the second compression part.

In a case in which a target flow rate of air to be supplied to the power source is lower than a maximum flow rate of one of the first compression part and the second compression part, the air compressed by one of the first compression part and the second compression part may be supplied to the power source.

In a case in which a target flow rate of air to be supplied to the power source is higher than a maximum flow rate of one of the first compression part and the second compression part, the air compressed by the first compression part and the air compressed by the second compression part may be supplied to the power source.

In a case in which a target compression ratio of air to be supplied to the power source is higher than a maximum compression ratio of one of the first compression part and the second compression part, the air compressed by the first compression part may be compressed again by the second compression part and may then supplied to the power source.

The supercharger may include a housing configured to accommodate the first compression part and the second compression part.

The housing may include: a first inlet port through which the outside air is supplied to the first compression part; a first outlet port through which the air compressed by the first compression part is discharged; a second inlet port through which the outside air is supplied to the second compression part; and a second outlet port through which the air compressed by the second compression part is discharged.

The first valve module may include: a first valve body defining a first inner flow path; a first flow path port communicating with the first inner flow path and connected to the first outlet port; a first flow path control valve configured to selectively open or close the first inner flow path; a second flow path port communicating with the first inner flow path and connected to the power source; a third flow path port disposed between the second flow path port and the first flow path control valve, communicating with the first inner flow path, and connected to the second outlet port; a second flow path control valve configured to selectively open or close the third flow path port; a fourth flow path port communicating with the first inner flow path and connected to the second inlet port; and a third flow path control valve configured to selectively open or close the fourth flow path port.

The second valve module may include: a second valve body defining a second inner flow path; a first port communicating with the second inner flow path and configured such that the outside air is introduced into the first port; a first valve configured to selectively open or close the first port; a second port communicating with the second inner flow path and connected to the second inlet port; a third port communicating with the second inner flow path and connected to the fourth flow path port; and a second valve configured to selectively open or close the third port.

In a case in which a target flow rate of air to be supplied to the power source is lower than a maximum flow rate of one of the first compression part and the second compression part, the first flow path control valve may be opened, and the second flow path control valve and the third flow path control valve may be closed.

In a case in which a target flow rate of air to be supplied to the power source is higher than a maximum flow rate of one of the first compression part and the second compression part, the first flow path control valve and the second flow path control valve may be opened, the third flow path control valve may be closed, the first valve may be opened, and the second valve may be closed.

In a case in which a target compression ratio of air to be supplied to the power source is higher than a maximum compression ratio of one of the first compression part and the second compression part, the first flow path control valve may be closed, the second flow path control valve and the third flow path control valve may be opened, the first valve may be closed, and the second valve may be opened.

The supercharger may include an inverter disposed in the housing and configured to control an operation of the first compression part and an operation of the second compression part.

The first compression part and the second compression part may be disposed at opposite sides of the inverter.

The first compression part may include a first driving source and a first impeller configured to compress the outside air by being rotated by the first driving source. The second compression part may include a second driving source and a second impeller configured to compress the outside air by being rotated by the second driving source.

The first driving source may include a first stator and a first rotor configured to be rotated by an electrical interaction with the first stator. The second driving source may include a second stator and a second rotor configured to be rotated by an electrical interaction with the second stator.

In another general aspect, a method of controlling a supercharger for a vehicle includes: detecting a target output of a power source of the vehicle; determining a target flow rate and a target compression ratio of air to be supplied to the power source in accordance with the target output; comparing a maximum flow rate and a maximum compression ratio of one of a first compression part and a second compression part included in the supercharger with the target flow rate and the target compression ratio; and controlling an operation of one or both of the first compression part and the second compression part based on a result of the comparing.

The method may include, in a case in which the target flow rate is lower than the maximum flow rate of one of the first compression part and the second compression part, supplying air compressed by one of the first compression part and the second compression part to the power source.

The method may include, in a case in which the target flow rate is equal to or higher than the maximum flow rate of one of the first compression part and the second compression part, supplying air compressed by the first compression part and the second compression part to the power source.

The method may include, in a case in which the target compression ratio is higher than the maximum compression ratio of one of the first compression part and the second compression part, compressing air already compressed by the first compression part by the second compression part and then supplying the air compressed by the second compression part to the power source.

Other features and aspects will be apparent from the following detailed description, the drawings, and the claims.

DETAILED DESCRIPTION

Figure 1:
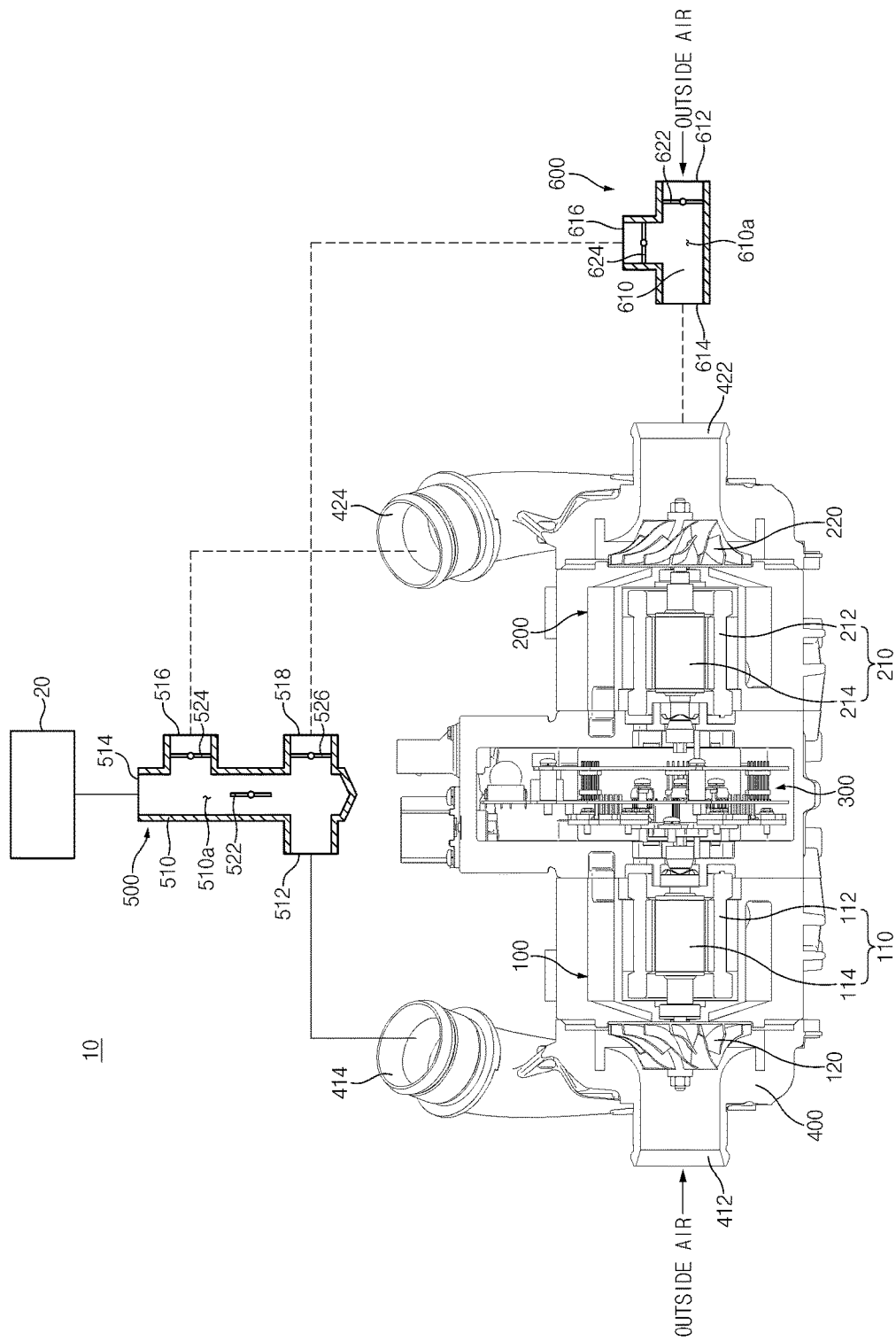
FIG. 1 is a view for explaining a supercharger for a vehicle according to an embodiment of the present disclosure.

Hereinafter, embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiment of the present disclosure are for explaining the embodiments, not for limiting the present disclosure.

Unless particularly stated otherwise in the context of the present specification, a singular form may also include a plural form. The explanation "at least one (or one or more) of A, B, and C" described herein may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element can be connected, coupled, or attached directly to another constituent element or connected, coupled, or attached to another constituent element through still another constituent element interposed therebetween.

In addition, the explanation "one constituent element is formed or disposed above (on) or below (under) another constituent element" includes not only a case in which the two constituent elements are in direct contact with each other, but also a case in which one or more additional constituent elements are formed or disposed between the two constituent elements. In addition, the expression "above (on) or below (under)" may include a meaning of a downward direction as well as an upward direction based on one constituent element.

Referring to FIGS. 1 to 4, a supercharger 10 for a vehicle according to an embodiment of the present disclosure includes: a first compression part 100 configured to compress outside air; a second compression part 200 configured to compress outside air independently of the first compression part 100; a first valve module 500 configured to selectively switch a path of the air compressed by the first compression part 100 to a power source 20 of the vehicle or the second compression part 200 and to selectively guide the air compressed by the second compression part 200 to the power source 20; and a second valve module 600 configured to selectively shut off the flow of air into the second compression part 200 from the first compression part 100 or the outside of the second compression part 200.

For reference, the supercharger 10 for a vehicle according to the embodiment of the present disclosure may be used to supercharge the power source 20 of the vehicle with the outside air (e.g., air), and the present disclosure is not restricted or limited by the type and the property of the vehicle to which the supercharger 10 for a vehicle is applied.

For example, the supercharger 10 for a vehicle may be used to supercharge an engine of a vehicle with outside air. According to another embodiment of the present disclosure, the supercharger for a vehicle may be configured to supercharge another power source (e.g., a fuel cell stack), instead of the engine, with outside air.

The first compression part 100 and the second compression part 200 are provided to independently compress the outside air.

According to the exemplary embodiment of the present disclosure, the supercharger 10 for a vehicle includes a housing 400 that accommodates therein the first compression part 100 and the second compression part 200.

Since both the first compression part 100 and the second compression part 200 are accommodated in the single housing 400 as described above, it is possible to obtain an advantageous effect of simplifying a structure and a manufacturing process, reducing costs, and improving a degree of design freedom and spatial utilization.

Meanwhile, in the embodiment of the present disclosure illustrated and described above, the example in which both the first compression part 100 and the second compression part 200 are accommodated in the single housing 400 has been described. However, according to another embodiment of the present disclosure, it is possible to implement a configuration in which the first compression part and the second compression part are accommodated in different housings provided individually.

In particular, the housing 400 may include a first inlet port 412 through which the outside air is supplied to the first compression part 100, a first outlet port 414 through which the air compressed by the first compression part 100 is discharged, a second inlet port 422 through which the outside air is supplied to the second compression part 200, and a second outlet port 424 through which the air compressed by the second compression part 200 is discharged.

The positions and the structures of the first inlet port 412, the first outlet port 414, the second inlet port 422, and the second outlet port 424 may be variously changed in accordance with required conditions and design specifications, and the present disclosure is not restricted or limited by the positions and the structures of the first inlet port 412, the first outlet port 414, the second inlet port 422, and the second outlet port 424.

For example, based on FIG. 1, the first inlet port 412 may be disposed at a left end of the housing 400, the first outlet port 414 may be disposed at a left upper end of the housing 400, the second inlet port 422 may be disposed at a right end of the housing 400, and the second outlet port 424 may be disposed at a right upper end of the housing 400. According to another embodiment of the present disclosure, the outlet port or the inlet port may be disposed at a lower end of the housing or another position on the housing.

The air introduced into the first inlet port 412 may be compressed by the first compression part 100 and then discharged through the first outlet port 414. The air introduced into the second inlet port 422 may be compressed by the second compression part 200 and then discharged through the second outlet port 424.

The first compression part 100 may have various structures capable of compressing the outside air, and the present disclosure is not restricted or limited by the type and the structure of the first compression part 100.

For example, the first compression part 100 may include a first driving source 110, and a first impeller 120 configured to compress the outside air by being rotated by the first driving source 110.

The first driving source 110 is configured to provide driving power (rotational force) for rotating the first impeller 120, and the type and the structure of the first driving source 110 may be variously changed in accordance with required conditions and design specifications.

For example, the first driving source 110 may include a first stator 112, and a first rotor 114 configured to be rotated by an electrical interaction with the first stator 112.

The first stator 112 is accommodated in the housing 400, the first rotor 114 is rotatably provided in the first stator 112 with a predetermined air gap from the first stator 112, and a first shaft (not illustrated) of the first rotor 114 is coupled to the first impeller 120.

A first coil (not illustrated) is wound around the first stator 112 to induce the electrical interaction with the first rotor 114. As power is applied to the first coil, the first rotor 114 is rotated by the electrical interaction between the first stator 112 and the first rotor 114.

The first impeller 120 is provided to be rotated by the first driving source 110 to compress the outside air introduced into the first inlet port 412.

The type, the structure, and the size of the first impeller 120 may be variously changed in accordance with required conditions and design specifications, and the present disclosure is not restricted or limited by the type, the structure, and the size of the first impeller 120.

The second compression part 200 may have various structures capable of compressing the outside air, and the present disclosure is not restricted or limited by the type and the structure of the second compression part 200.

For example, the second compression part 200 may include a second driving source 210, and a second impeller 220 configured to compress the outside air by being rotated by the second driving source 210.

The second driving source 210 is configured to provide driving power (rotational force) for rotating the second impeller 220, and the type and the structure of the second driving source 210 may be variously changed in accordance with required conditions and design specifications.

For example, the second driving source 210 may include a second stator 212, and a second rotor 214 configured to be rotated by an electrical interaction with the second stator 212.

The second stator 212 is accommodated in the housing 400, the second rotor 214 is rotatably provided in the second stator 212 with a predetermined air gap from the second stator 212, and a second shaft (not illustrated) of the second rotor 214 is coupled to the second impeller 220.

A second coil (not illustrated) is wound around the second stator 212 to induce the electrical interaction with the second rotor 214. As power is applied to the second coil, the second rotor 214 is rotated by the electrical interaction between the second stator 212 and the second rotor 214.

The second impeller 220 is provided to be rotated by the second driving source 210 to compress the outside air introduced into the second inlet port 422.

The type, the structure, and the size of the second impeller 220 may be variously changed in accordance with required conditions and design specifications, and the present disclosure is not restricted or limited by the type, the structure, and the size of the second impeller 220.

According to the exemplary embodiment of the present disclosure, the supercharger 10 for a vehicle may include an inverter part 300 provided in the housing 400 and configured to control an operation of the first compression part 100 and an operation of the second compression part 200.

In the embodiment of the present disclosure, since the single inverter part 300 is used in common to control the operation of the first compression part 100 and the operation of the second compression part 200 as described above, it is possible to obtain an advantageous effect of simplifying the structure and improving the degree of design freedom and the spatial utilization.

The inverter part 300 may include a central processing unit (CPU) or a semiconductor device that processes instructions stored in a memory and/or a storage. The memory and the storage may include various types of volatile or nonvolatile storage media. For example, the memory may include a read only memory (ROM) and a random-access memory (RAM).

In particular, the first compression part 100 and the second compression part 200 are symmetrically disposed at both sides of the inverter part 300 based on the inverter part 300. Since the first compression part 100 and the second compression part 200 are symmetrically provided at both sides of the inverter part 300 as described above, a connection structure between the first compression part 100 and the inverter part 300 and a connection structure between the second compression part 200 and the inverter part 300 may be used in common (the same type connecting member is used to connect the first compression part 100 and the inverter part 300 and connect the second compression part 200 and the inverter part 300). As a result, it is possible to obtain an advantageous effect of simplifying the structure and the assembly process.

The first valve module 500 is provided to selectively switch the path of the air compressed by the first compression part 100 to the power source 20 of the vehicle or the second compression part 200 and to selectively guide the air compressed by the second compression part 200 to the power source 20.

In addition, the second valve module 600 is provided to selectively shut off the flow of air into the second compression part 200 from the first compression part 100 or the outside of the second compression part 200.

Since the first valve module 500 and the second valve module 600 are provided as described above, the path of the air compressed by the first compression part 100 may be switched to the power source 20 or the second compression part 200, and the supply of the air to be supplied from the second compression part 200 to the power source 20 may be shut off selectively. As a result, it is possible to change a flow rate and a compression ratio of the air to be supplied to the power source 20 in accordance with required conditions (e.g., target outputs of the power source 20).

For example, in a low-flow-rate supercharging condition (a condition in which a target flow rate of the air to be supplied to the power source 20 is lower than a maximum flow rate of any one of the first compression part 100 and the second compression part 200, the compressed air may be supplied to the power source 20 only from any one of the first compression part 100 and the second compression part 200.

As another example, in a high-flow-rate supercharging condition (a condition in which the target flow rate of the air to be supplied to the power source 20 is higher than the maximum flow rate of any one of the first compression part 100 and the second compression part 200), both the air compressed by the first compression part 100 and the air compressed by the second compression part 200 (the outside air compressed by the first compression part 100 and the outside air compressed by the second compression part 200) may be supplied to the power source 20.

As still another example, in a high-compression-ratio supercharging condition (a condition in which a target compression ratio of the air to be supplied to the power source 20 is higher than a maximum compression ratio of any one of the first compression part 100 and the second compression part 200), the air compressed by the first compression part 100 may be compressed again by the second compression part 200 and then supplied to the power source 20.

In this case, the target flow rate of the air to be supplied to the power source 20 may be understood as being a supercharging flow rate of the air (a flow rate of the air to be supplied to the power source) determined in accordance with the target output of the power source 20. In addition, the target compression ratio of the air to be supplied to the power source 20 may be understood as being a supercharging compression ratio of the air (a degree to which the air to be supplied to the power source is compressed) determined in accordance with the target output of the power source 20.

The first valve module 500 may have various structures capable of selectively switching the path of the air compressed by the first compression part 100 to the power source 20 of the vehicle or the second compression part 200 and selectively guiding the air compressed by the second compression part 200 to the power source 20, and the present disclosure is not restricted or limited by the structure of the first valve module 500.

For example, the first valve module 500 may include: a first valve body 510 including a first inner flow path 510*a*; a first flow path port 512 communicating with the first inner flow path 510*a* and connected to the first outlet port 414; a first flow path control valve 522 configured to selectively open or close the first inner flow path 510a; a second flow path port 514 communicating with the first inner flow path 510a and connected to the power source 20; a third flow path port 516 disposed between the second flow path port 514 and the first flow path control valve 522, communicating with the first inner flow path 510a, and connected to the second outlet port 424; a second flow path control valve 524 configured to selectively open or close the third flow path port 516; a fourth flow path port 518 communicating with the first inner flow path 510a and connected to the second inlet port 422; and a third flow path control valve 526 configured to selectively open or close the fourth flow path port 518.

The first valve body 510 may have various structures having therein the first inner flow path 510a, and the present disclosure is not restricted or limited by the shape and the structure of the first valve body 510. For example, the first valve body 510 may be provided in a tubular shape having therein the first inner flow path 510a.

The first flow path port 512 may be disposed at one side of the first valve body 510 and may communicate with the first inner flow path 510a, and the first flow path port 512 and the first outlet port 414 may be connected with a first connection line (not illustrated).

The position of the first flow path port 512 may be variously changed in accordance with required conditions and design specifications. For example, the first flow path port 512 may be disposed at a left lower end (based on FIG. 1) of the first valve body 510 and may communicate with the first inner flow path 510a.

The first flow path control valve 522 is provided to selectively open or close the first inner flow path 510a. In this case, the configuration in which the first flow path control valve 522 selectively opens or closes the first inner flow path 510a means that the first flow path control valve 522 may completely close or completely open the first inner flow path 510a or adjust an opening degree (valve opening angle) (i.e., adjusts a degree to which the first inner flow path 510a is opened).

Various valves capable of selectively opening or closing the first inner flow path 510a may be used as the first flow path control valve 522, and the present disclosure is not restricted or limited by the type and the structure of the first flow path control valve 522. For example, the first flow path control valve 522 may selectively open or close the first inner flow path 510a while rotating about a rotation axis (not illustrated) thereof.

The second flow path port 514 may be disposed at the other side of the first valve body 510 and may communicate with the first inner flow path 510a, and the second flow path port 514 and the power source 20 may be connected with a second connection line (not illustrated).

The position of the second flow path port 514 may be variously changed in accordance with required conditions and design specifications. For example, the second flow path port 514 may be disposed at an upper end (based on FIG. 1) of the first valve body 510 and may communicate with the first inner flow path 510a.

The third flow path port 516 may be disposed at the other side of the first valve body 510 and may communicate with the first inner flow path 510a, and the third flow path port 516 and the second outlet port 424 may be connected with a third connection line (not illustrated).

The position of the third flow path port 516 may be variously changed in accordance with required conditions and design specifications. For example, the third flow path port 516 may be disposed at a right upper end (based on FIG. 1) of the first valve body 510 and may communicate with the first inner flow path 510a.

The second flow path control valve 524 is provided to selectively open or close the third flow path port 516. In this case, the configuration in which the second flow path control valve 524 selectively closes or opens the third flow path port 516 means that the second flow path control valve 524 may completely close or completely open the third flow path port 516 or adjust an opening degree (a degree to which the third flow path port 516 is opened).

Various valves capable of selectively opening or closing the third flow path port 516 may be used as the second flow path control valve 524, and the present disclosure is not restricted or limited by the type and the structure of the second flow path control valve 524. For example, the second flow path control valve 524 may selectively open or close the third flow path port 516 while rotating a rotation axis (not illustrated) thereof.

The fourth flow path port 518 may be disposed at the other side of the first valve body 510 and may communicate with the first inner flow path 510a, and the fourth flow path port 518 may be connected to the second inlet port 422 with a fourth connection line (not illustrated) via the second valve module 600.

The position of the fourth flow path port 518 may be variously changed in accordance with required conditions and design specifications. For example, the fourth flow path port 518 may be disposed at a right lower end (based on FIG. 1) of the first valve body 510 and may communicate with the first inner flow path 510a.

The third flow path control valve 526 is provided to selectively open or close the fourth flow path port 518. In this case, the configuration in which the third flow path control valve 526 selectively opens or closes the fourth flow path port 518 means that the third flow path control valve 526 may completely close or completely open the fourth flow path port 518 or adjust an opening degree (a degree to which the fourth flow path port 518 is opened).

Various valves capable of selectively opening or closing the fourth flow path port 518 may be used as the third flow path control valve 526, and the present disclosure is not restricted or limited by the type and the structure of the third flow path control valve 526. For example, the third flow path control valve 526 may selectively open or close the fourth flow path port 518 while rotating about a rotation axis (not illustrated) thereof.

When the first flow path control valve 522 is opened and the second flow path control valve 524 and the third flow path control valve 526 are closed, the air compressed by the first compression part 100 may be supplied to the power source 20.

In contrast, when the first flow path control valve 522 is closed and the third flow path control valve 526 is opened, the air compressed by the first compression part 100 may be supplied to the second compression part 200 via the second valve module 600.

In addition, when the second flow path control valve 524 is opened, the air compressed by the second compression part 200 may be supplied to the power source 20. Further, the first flow path control valve 522 and the third flow path control valve 526 may be opened or closed in the state in which the second flow path control valve 524 is opened.

The second valve module 600 may have various structures capable of selectively shutting off the flow of the air into the second compression part 200 from the first compression part 100 or the outside of the second compression part 200, and the present disclosure is not restricted or limited by the structure of the second valve module 600.

For example, the second valve module 600 may include: a second valve body 610 including a second inner flow path 610a; a first port 612 communicating with the second inner flow path 610a and configured such that the outside air is introduced into the first port 612; a first valve 622 configured to selectively open or close the first port 612; a second port 614 communicating with the second inner flow path 610a and connected to the second inlet port 422; a third port 616 communicating with the second inner flow path 610a and connected to the fourth flow path port 518; and a second valve 624 configured to selectively open or close the third port 616.

The second valve body 610 may have various structures having therein the second inner flow path 610a, and the present disclosure is not restricted or limited by the shape and the structure of the second valve body 610. For example, the second valve body 610 may be provided in a tubular shape (e.g., in the form of a T-shaped tube) having therein the second inner flow path 610a.

The first port 612 may be disposed at one side of the second valve body 610 and may communicate with the second inner flow path 610a, and the outside air may be introduced into the first port 612 from the outside.

The position of the first port 612 may be variously changed in accordance with required conditions and design specifications. For example, the first port 612 may be disposed at a right end (based on FIG. 1) of the second valve body 610.

The first valve 622 is provided to selectively open or close the first port 612. In this case, the configuration in which the first valve 622 selectively opens or closes the first port 612 means that the first valve 622 may completely close or completely open the first port 612 or adjust an opening degree (a degree to which the first port 612 is opened).

Various valves capable of selectively opening or closing the first port 612 may be used as the first valve 622, and the present disclosure is not restricted or limited by the type and the structure of the first valve 622. For example, the first valve 622 may selectively open or close the first port 612 while rotating about a rotation axis (not illustrated) thereof.

The second port 614 may be disposed at the other side of the second valve body 610 and may communicate with the second inner flow path 610a, and the second port 614 and the second inlet port 422 may be connected with a connection line (not illustrated).

The position of the second port 614 may be variously changed in accordance with required conditions and design specifications. For example, the second port 614 may be disposed at a left end (based on FIG. 1) of the second valve body 610 and may communicate with the second inner flow path 610a.

The third port 616 may be disposed at the other side of the second valve body 610 and may communicate with the second inner flow path 610a, and the third port 616 and the fourth flow path port 518 may be connected with the fourth connection line (not illustrated).

The position of the third port 616 may be variously changed in accordance with required conditions and design specifications. For example, the third port 616 may be disposed at an upper end (based on FIG. 1) of the second valve body 610 and may communicate with the second inner flow path 610a.

The second valve 624 is provided to selectively open or close the third port 616. In this case, the configuration in which the second valve 624 selectively opens or closes the third port 616 means that the second valve 624 may completely close or completely open the third port 616 or adjust an opening degree (a degree to which the third port 616 is opened).

Various valves capable of selectively opening or closing the third port 616 may be used as the second valve 624, and the present disclosure is not restricted or limited by the type and the structure of the second valve 624. For example, the second valve 624 may selectively open or close the third port 616 while rotating about a rotation axis (not illustrated) thereof.

When the first valve 622 is opened and the second valve 624 is closed, the outside air may be supplied to the second compression part 200.

In contrast, when the first valve 622 is closed and the second valve 624 is opened, the air compressed by the first compression part 100 may be supplied to the second compression part 200.

With the above-mentioned structure, it is possible to selectively change the flow rate and the compression ratio of the air to be supplied to the power source 20 in accordance with required conditions (e.g., the target output of the power source 20).

Figure 2:
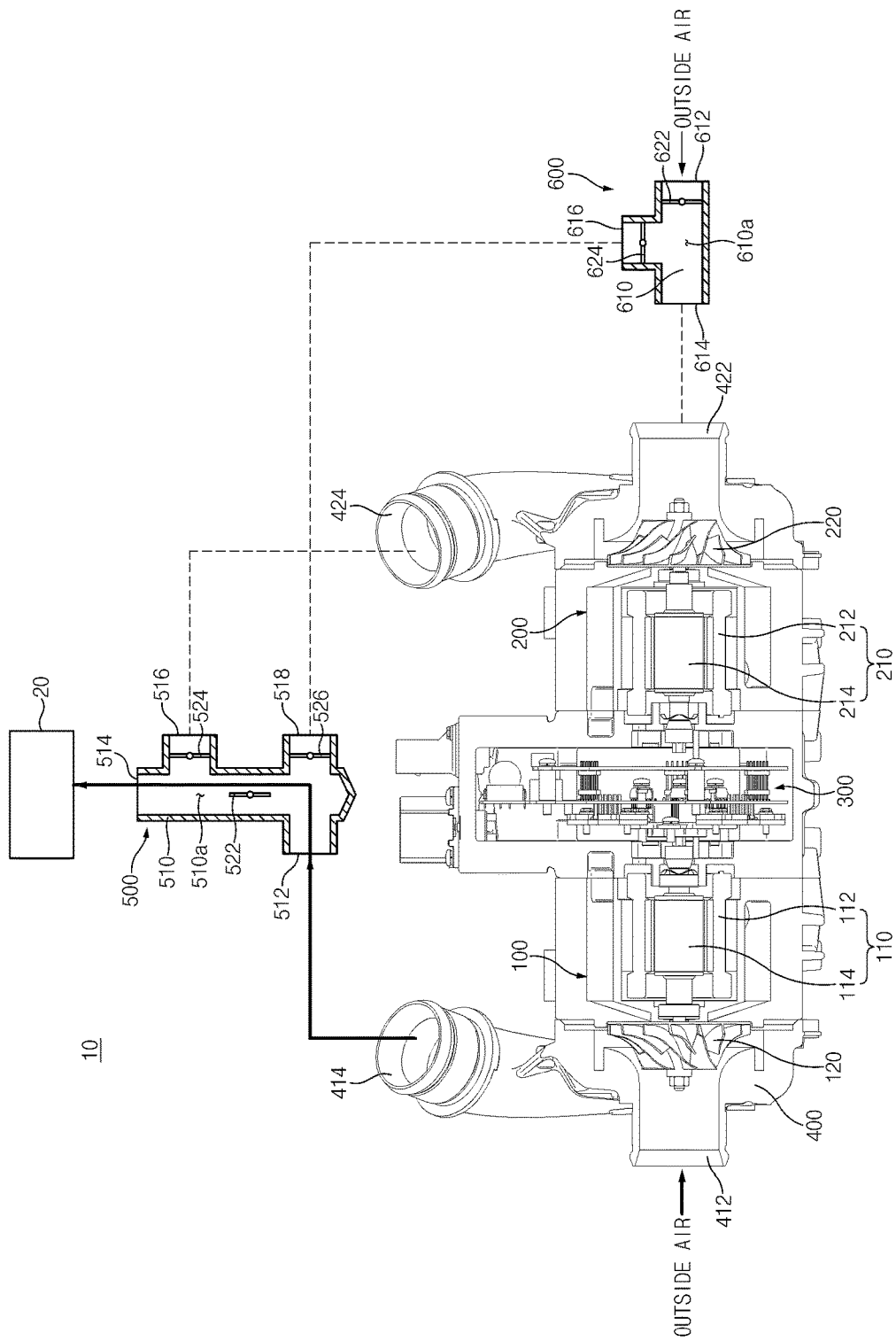
FIG. 2 is a view for explaining a flow of outside air during supercharging for a low flow rate in the supercharger for a vehicle according to the embodiment of the present disclosure.

For example, referring to FIG. 2, in the low-flow-rate supercharging condition (the condition in which the target flow rate of the air to be supplied to the power source 20 is lower than the maximum flow rate of any one of the first compression part 100 and the second compression part 200), the first flow path control valve 522 is opened, and the second flow path control valve 524 and the third flow path control valve 526 are closed, such that only the air compressed by the first compression part 100 may be supplied to the power source 20.

Figure 3:
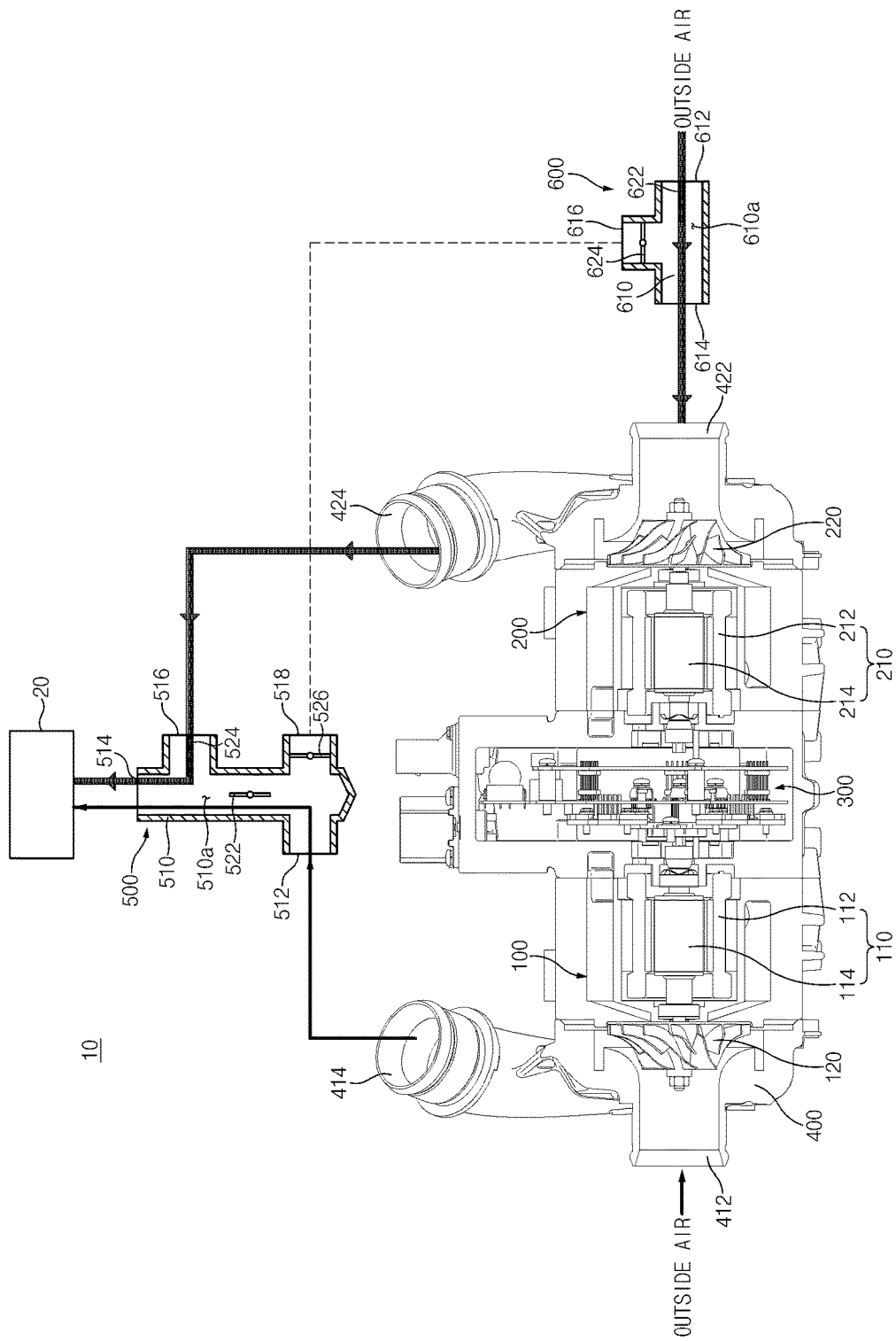
FIG. 3 is a view for explaining a flow of outside air during supercharging for a high flow rate in the supercharger for a vehicle according to the embodiment of the present disclosure.

As another example, referring to FIG. 3, in the high-flow-rate supercharging condition (the condition in which the target flow rate of the air to be supplied to the power source 20 is higher than the maximum flow rate of any one of the first compression part 100 and the second compression part 200), the first flow path control valve 522 and the second flow path control valve 524 are opened, the third flow path control valve 526 is closed, the first valve 622 is opened, and the second valve 624 is closed, such that both the air compressed by the first compression part 100 and the air compressed by the second compression part 200 (the outside air compressed by the first compression part 100 and the outside air compressed by the second compression part 200) may be supplied to the power source 20.

Figure 4:
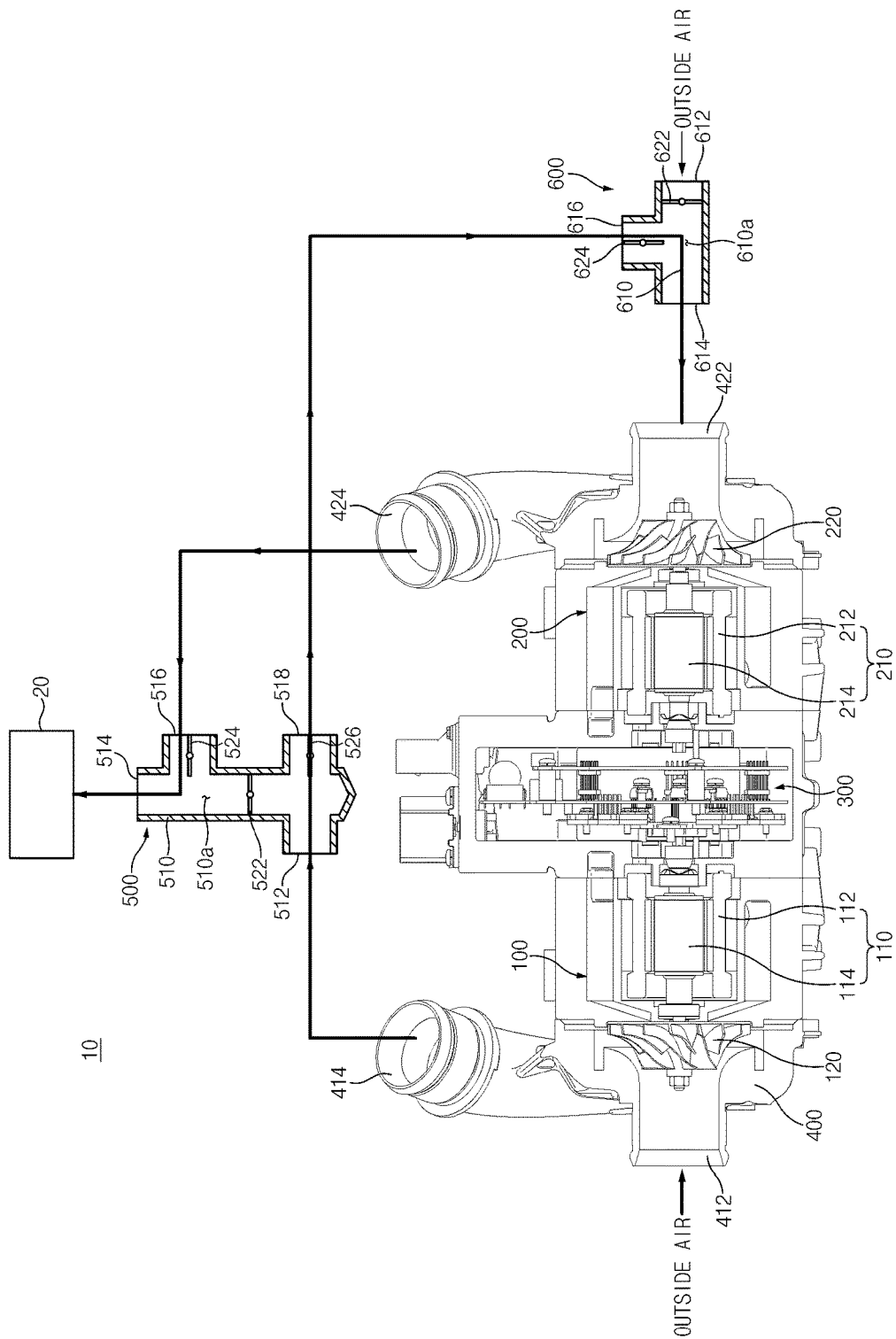
FIG. 4 is a view for explaining a flow of outside air during supercharging for a high compression ratio in the supercharger for a vehicle according to the embodiment of the present disclosure.

As still another example, referring to FIG. 4, in the high-compression-ratio supercharging condition (the condition in which the target compression ratio of the air to be supplied to the power source 20 is higher than the maximum compression ratio of any one of the first compression part 100 and the second compression part 200), the first flow path control valve 522 is closed, the second flow path control valve 524 and the third flow path control valve 526 are opened, the first valve 622 is closed, and the second valve 624 is opened, such that the air compressed by the first compression part 100 may be guided to and compressed again (secondarily compressed) by the second compression part 200 and then supplied to the power source 20.

Figure 5:
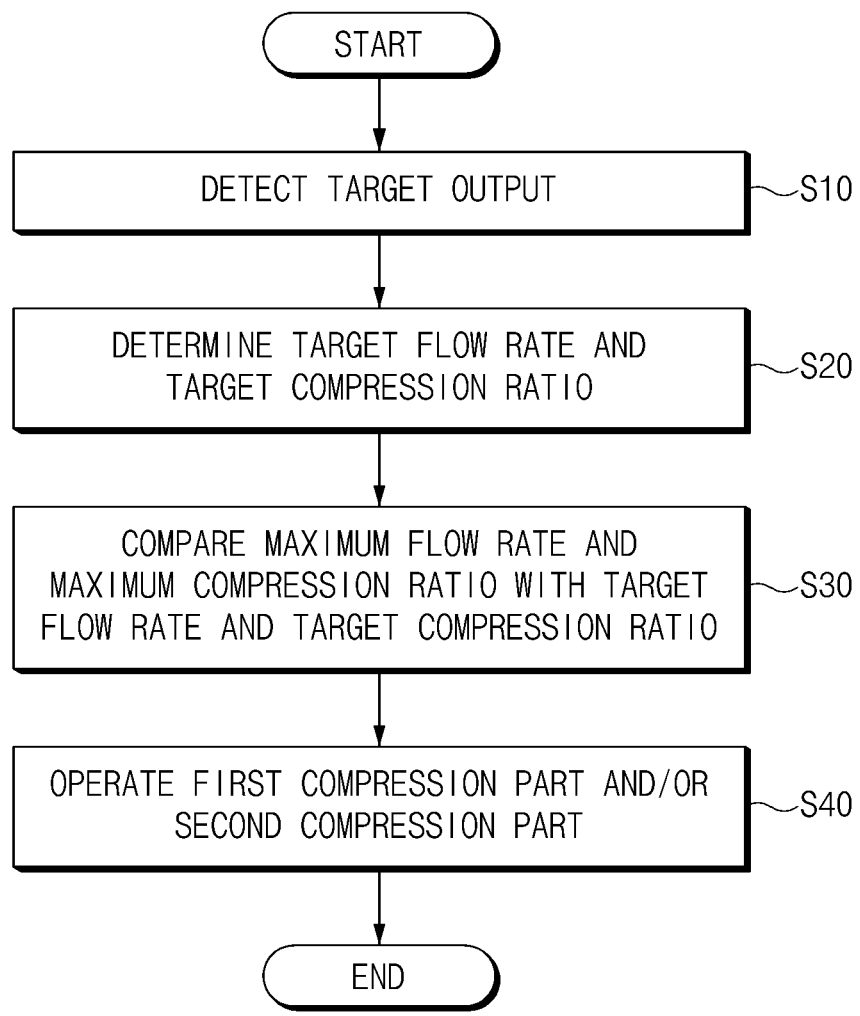
FIG. 5 is a flowchart for explaining a method of controlling the supercharger for a vehicle according to the embodiment of the present disclosure.
Figure 6A:
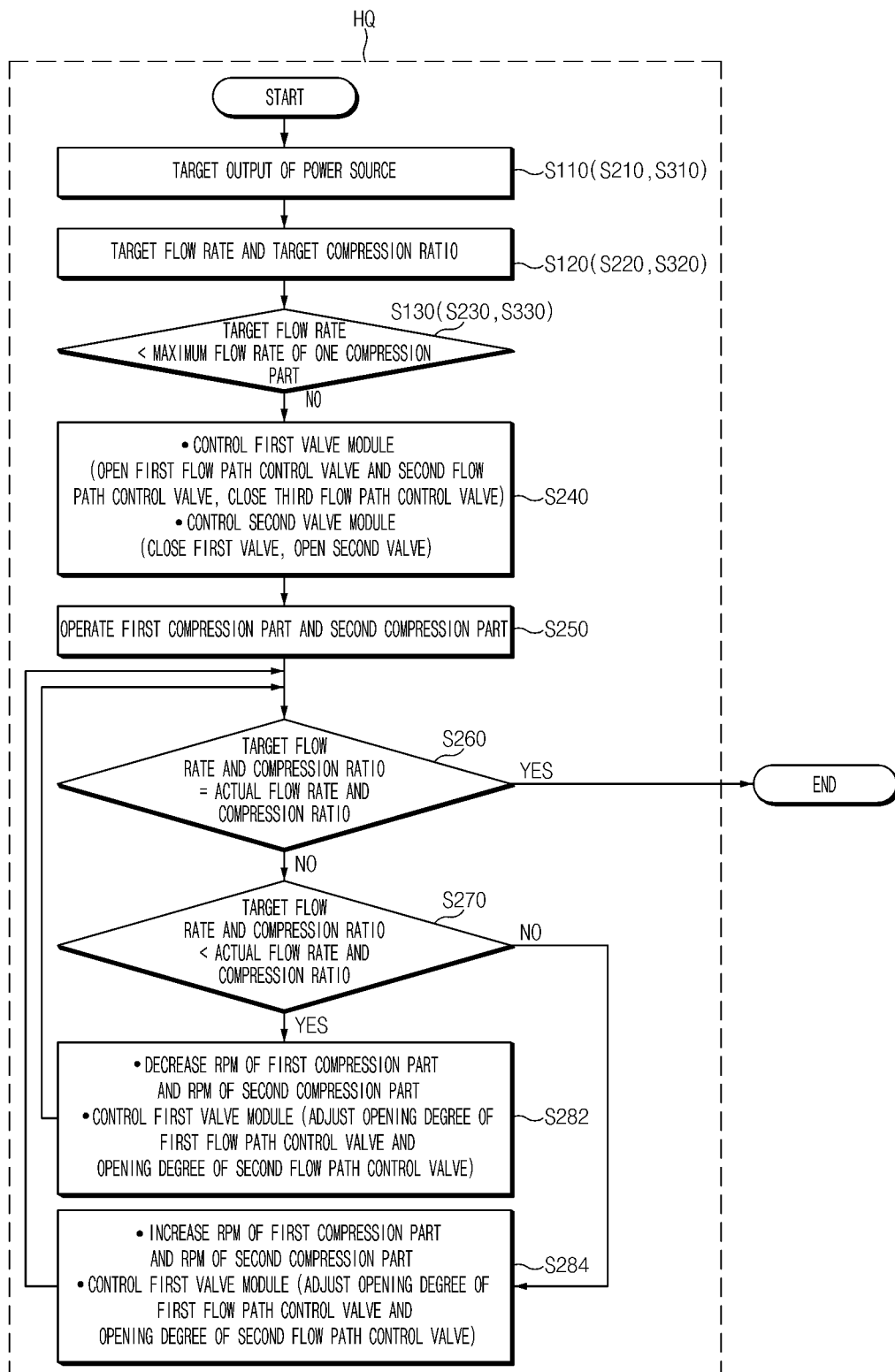
FIGS. 6A to 6C are a flowchart for explaining a method of controlling the supercharger for a vehicle according to the embodiment of the present disclosure in accordance with a target output of a power source.
Figure 6B:
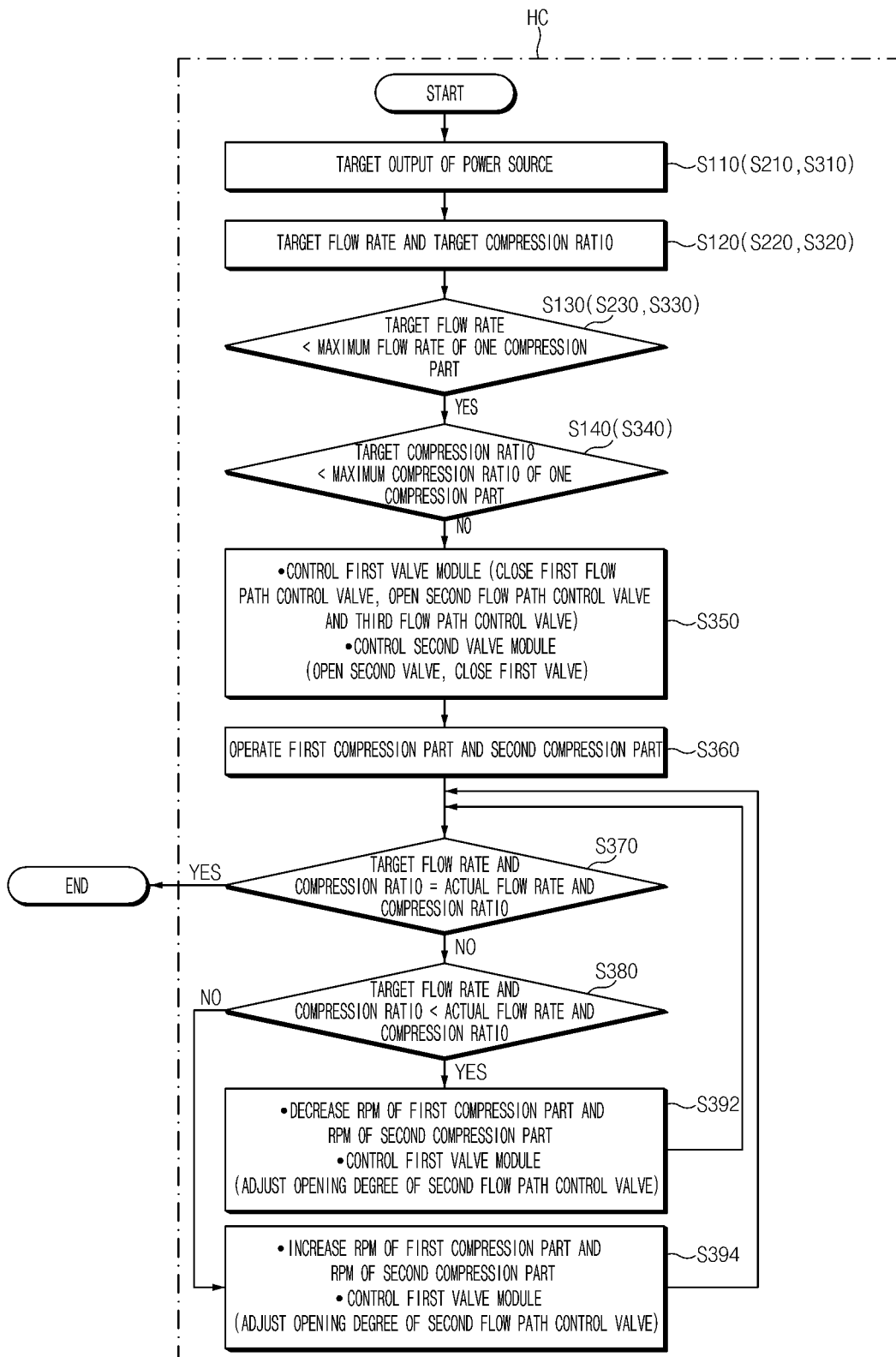
Figure 6C:
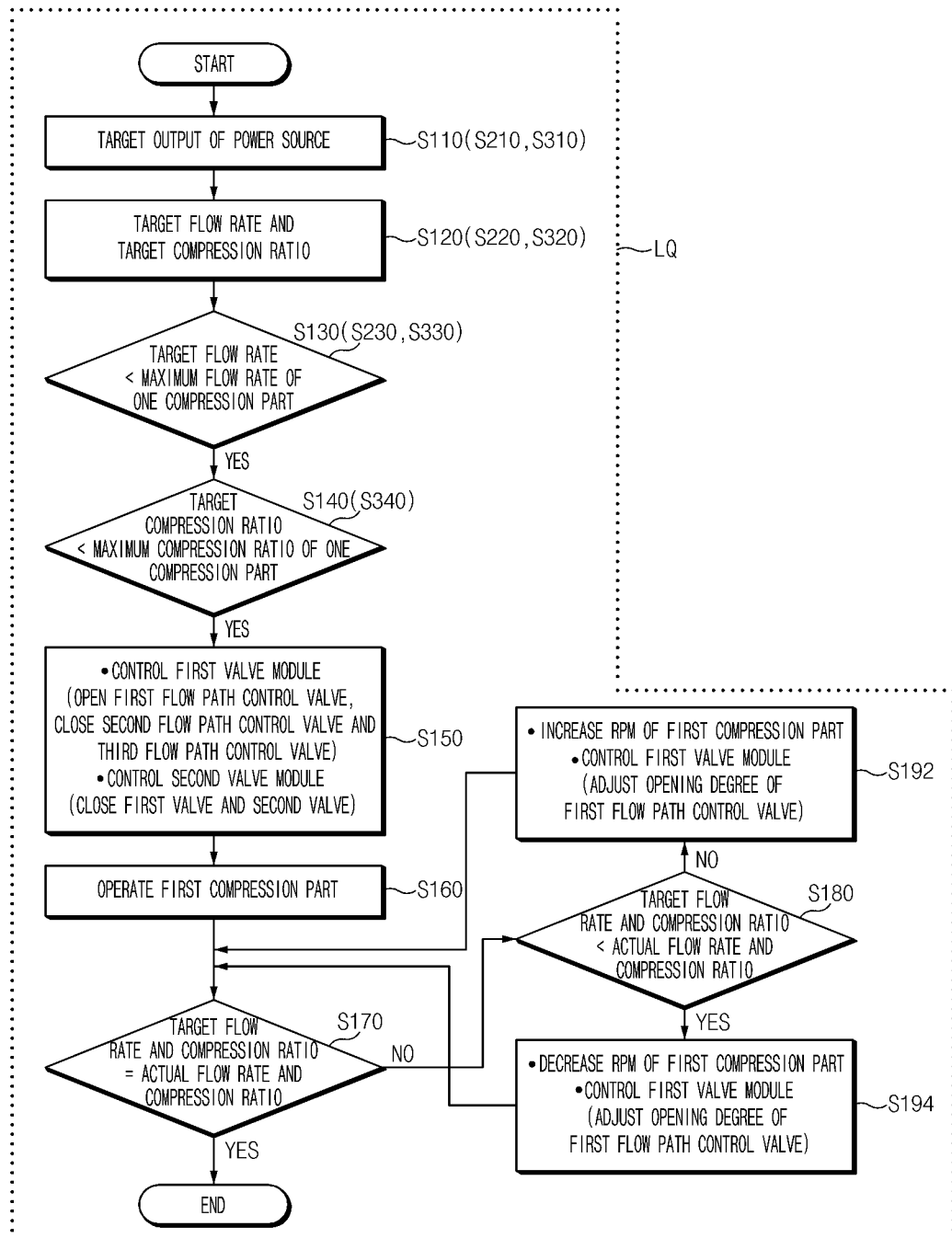

Meanwhile, FIG. 5 is a flowchart for explaining a method of controlling the supercharger 10 for a vehicle according to the embodiment of the present disclosure, and FIGS. 6A to 6C are a flowchart for explaining a method of controlling the supercharger 10 for a vehicle according to the embodiment of the present disclosure in accordance with the target output of the power source 20.

Further, the parts identical and equivalent to the parts in the above-mentioned configuration will be designated by the identical or equivalent reference numerals, and detailed descriptions thereof will be omitted.

Referring to FIG. 5, according to another exemplary aspect of the present disclosure, a method of controlling the supercharger 10 for a vehicle, the supercharger 10 including: the first compression part 100 configured to compress the outside air; the second compression part 200 configured to compress the outside air independently of the first compression part 100; the first valve module 500 configured to selectively switch the path of the air compressed by the first compression part 100 to the power source 20 of the vehicle or the second compression part 200 and to selectively guide the air compressed by the second compression part 200 to the power source 20; and the second valve module 600 configured to selectively shut off the flow of the air into the second compression part 200 from the first compression part 100 or the outside of the second compression part 200, the method including: a detection step of detecting the target output of the power source 20; a determination step of determining the target flow rate and the target compression ratio of the air to be supplied to the power source 20 in accordance with the target output; a comparison step of comparing the maximum flow rate and the maximum compression ratio of any one of the first compression part 100 and the second compression part 200 with the target flow rate and the target compression ratio; and a control step of controlling the operation of at least any one of the first compression part 100 and the second compression part 200 based on the result calculated in the comparison step.

Step 1:

First, the target output of the power source 20 is detected (S10).

In the detection step S10, the target output of the power source 20 (the engine or the fuel cell stack) may be detected based on a signal received by a power source control unit (an ECU or an FCU) from various types of sensors and switches.

Step 2:

Next, the target flow rate and the target compression ratio of the air to be supplied to the power source 20 are determined in accordance with the target output (S20).

In the determination step S20, the target flow rate and the target compression ratio of the air to be supplied to the power source 20 are determined in accordance with the target output of the power source 20.

In particular, the target flow rate and the target compression ratio may be stored in advance in a lookup table for each target output, and thus the target flow rate and the target compression ratio for each target output may be quickly determined using information stored in advance in the lookup table.

Further, information (the target flow rate and the target compression ratio for each target output), which is not stored in advance in the lookup table, may be calculated by means of interpolation using information on errors between adjacent values stored in advance.

Step 3:

Next, the maximum flow rate and the maximum compression ratio of any one of the first compression part 100 and the second compression part 200 are compared with the target flow rate and the target compression ratio (S30).

For example, in the comparison step S30, the maximum flow rate and the maximum compression ratio, which may be implemented by the first compression part 100, may be compared with the target flow rate and the target compression ratio.

In this case, the target flow rate may be understood as being the supercharging flow rate of the air (the flow rate of the air to be supplied to the power source 20) determined in accordance with the target output of the power source 20. In addition, the target compression ratio may be understood as being the supercharging compression ratio of the air (the degree to which the air to be supplied to the power source 20 is compressed) determined in accordance with the target output of the power source 20.

Step 4:

Next, based on the result calculated in the comparison step, the operation of at least any one of the first compression part 100 and the second compression part 200 is controlled (S40).

In the control step S40, based on the result calculated in the comparison step (the result of comparing the maximum flow rate with the target flow rate and the result of comparing the maximum compression ratio with the target compression ratio), the operation of at least any one of the first compression part 100 and the second compression part 200 may be controlled.

For example, referring to FIG. 2, in the control step S40, the air compressed by the first compression part 100 may be supplied to the power source 20 in the condition (low-flow-rate supercharging condition) in which the target flow rate of the air to be supplied to the power source 20 is lower than the maximum flow rate of any one of the first compression part 100 and the second compression part 200. According to another embodiment of the present disclosure, in the low-flow-rate supercharging condition, the air compressed by the second compression part may be supplied to the power source in the control step.

As another example, referring to FIG. 3, in the condition (high-flow-rate supercharging condition) in which the target flow rate of the air to be supplied to the power source 20 is higher than the maximum flow rate of any one of the first compression part 100 and the second compression part 200, both the air compressed by the first compression part 100 and the air compressed by the second compression part 200 (the outside air compressed by the first compression part 100 and the outside air compressed by the second compression part 200) may be supplied to the power source 20 in the control step S40.

As still another example, referring to FIG. 4, in the condition (high-compression-ratio supercharging condition) in which the target compression ratio of the air to be supplied to the power source 20 is higher than the maximum compression ratio of any one of the first compression part 100 and the second compression part 200), the air compressed by the first compression part 100 may be compressed again by the second compression part 200 and then supplied to the power source 20 in the control step S40.

More specifically, referring to FIGS. 6A to 6C, a control method LQ during supercharging for a low flow rate may include: a detection step S110 of detecting the target output of the power source 20; a determination step S120 of determining the target flow rate and the target compression ratio of the air to be supplied to the power source 20 in accordance with the target output; a step S130 of comparing the maximum flow rate of the first compression part 100 (or the second compression part) with the target flow rate; a step S140 of comparing the maximum compression ratio of the first compression part 100 (or the second compression part) with the target compression ratio when the target flow rate is lower than the maximum flow rate; a step S150 of controlling the first valve module 500 and the second valve module 600 (opening the first flow path control valve 522, closing the second flow path control valve 524 and the third flow path control valve 526, and closing the first valve 622 and the second valve 624) when the target compression ratio is lower than the maximum compression ratio; a step S160 of operating the first compression part 100 (or the second compression part); a step S170 of determining whether an actual flow rate (an actual flow rate of the air supplied to the power source 20) and an actual compression ratio (an actual compression ratio of the air supplied to the power source 20), which are made by the operation of the first compression part 100, reach the target flow rate and the target compression ratio; a step S180 of comparing the target flow rate and the target compression ratio with the actual flow rate and the actual compression ratio; a step S192 of controlling the RPM (rotational speed) of the first compression part 100 (increasing the RPM of the first driving source 110) and controlling the first valve module 500 (adjusting the opening degree of the first flow path control valve 522) when the target flow rate and the target compression ratio are higher than the actual flow rate and the actual compression ratio; and a step S194 of controlling the RPM of the first compression part 100 (decreasing the RPM of the first driving source 110) and controlling the first valve module 500 (adjusting the opening degree of the first flow path control valve 522) when the target flow rate and the target compression ratio are lower than the actual flow rate and actual compression ratio.

In addition, referring to FIGS. 6A to 6C, a control method HQ during supercharging for a high flow rate may include: a detection step S210 of detecting the target output of the power source 20; a determination step S220 of determining the target flow rate and the target compression ratio of the air to be supplied to the power source 20 in accordance with the target output; a step S230 of comparing the maximum flow rate of the first compression part 100 (or the second compression part) with the target flow rate; a step S240 of controlling the first valve module 500 and the second valve module 600 (opening the first flow path control valve 522 and the second flow path control valve 524, closing the third flow path control valve 526, closing the first valve 622, and opening the second valve 624) when the target flow rate is higher than the maximum flow rate; a step S250 of operating the first compression part 100 and the second compression part 200; a step S260 of determining whether an actual flow rate (an actual flow rate of the air supplied to the power source 20) and an actual compression ratio (an actual compression ratio of the air supplied to the power source 20), which are made by the operation of the first compression part 100 and the operation of the second compression part 200, reach the target flow rate and the target compression ratio; a step S270 of comparing the target flow rate and the target compression ratio with the actual flow rate and the actual compression ratio; a step S282 of controlling the RPM of the first compression part 100 and the RPM of the second compression part 200 (decreasing the RPM of the first driving source 110 and decreasing the RPM of the second driving source 210) and controlling the first valve module 500 (adjusting the opening degree of the first flow path control valve 522 and the opening degree of the second flow path control valve 524) when the target flow rate and the target compression ratio are lower than the actual flow rate and the actual compression ratio; and a step S284 of controlling the RPM of the first compression part 100 and the RPM of the second compression part 200 (increasing the RPM of the first driving source 110 and the RPM of the second driving source 210) and controlling the first valve module 500 (adjusting the opening degree of the first flow path control valve 522 and the opening degree of the second flow path control valve 524) when the target flow rate and the target compression ratio are higher than the actual flow rate and the actual compression ratio.

In addition, referring to FIGS. 6A to 6C, a control method HC during supercharging for a high compression ratio may include: a detection step S310 of detecting the target output of the power source 20; a determination step S320 of determining the target flow rate and the target compression ratio of the air to be supplied to the power source 20 in accordance with the target output; a step S330 of comparing the maximum flow rate of the first compression part 100 (or the second compression part) with the target flow rate; a step S340 of comparing the maximum compression ratio of the first compression part 100 (or the second compression part) with the target compression ratio when the target flow rate is lower than the maximum flow rate; a step S350 of controlling the first valve module 500 and the second valve module 600 (closing the first flow path control valve 522, opening the second flow path control valve 524 and the third flow path control valve 526, closing the first valve 622, and opening the second valve 624) when the target compression ratio is higher than the maximum compression ratio; a step S360 of operating the first compression part 100 and the second compression part 200; a step S370 of determining whether an actual flow rate (an actual flow rate of the air supplied to the power source 20) and an actual compression ratio (an actual compression ratio of the air supplied to the power source 20), which are made by the operation of the first compression part 100 and the operation of the second compression part 200, reach the target flow rate and the target compression ratio; a step S380 of comparing the target flow rate and the target compression ratio with the actual flow rate and the actual compression ratio; a step S392 of controlling the RPM of the first compression part 100 and the RPM of the second compression part 200 (decreasing the RPM of the first driving source 110 and the RPM of the second driving source 210) and controlling the first valve module 500 (adjusting the opening degree of the second flow path control valve 524) when the target flow rate and the target compression ratio are lower than the actual flow rate and the actual compression ratio; and a step S294 of controlling the RPM of the first compression part 100 and the RPM of the second compression part 200 (increasing the RPM of the first driving source 110 and the RPM of the second driving source 210) and controlling the first valve module 500 (adjusting the opening degree of the second flow path control valve 524) when the target flow rate and the target compression ratio are higher than the actual flow rate and the actual compression ratio.

While the embodiments have been described above, but the embodiments are just illustrative and not intended to limit the present disclosure. It can be appreciated by those skilled in the art that various modifications and alterations, which are not described above, may be made to the present embodiment without departing from the intrinsic features of the present embodiment. For example, the respective constituent elements specifically described in the embodiments may be modified and then carried out. Further, it should be interpreted that the differences related to the modifications and alterations are included in the scope of the present disclosure defined by the appended claims.

What is claimed is:

1. A supercharger for a vehicle, the supercharger comprising:
    a first compression part configured to compress outside air;

a second compression part configured to compress the outside air independently of the first compression part; and a first valve module configured to selectively switch a path of the air compressed by the first compression part to a power source of the vehicle or the second compression part and to selectively guide or shut off the air compressed by the second compression part to the power source.

2. The supercharger of claim 1, wherein in a case in which a target flow rate of air to be supplied to the power source is lower than a maximum flow rate of one of the first compression part and the second compression part, the air compressed by one of the first compression part and the second compression part is supplied to the power source.

3. The supercharger of claim 1, wherein in a case in which a target flow rate of air to be supplied to the power source is higher than a maximum flow rate of one of the first compression part and the second compression part, the air compressed by the first compression part and the air compressed by the second compression part are supplied to the power source.

4. The supercharger of claim 1, wherein in a case in which a target compression ratio of air to be supplied to the power source is higher than a maximum compression ratio of one of the first compression part and the second compression part, the air compressed by the first compression part is compressed again by the second compression part and then supplied to the power source.

5. The supercharger of claim 1, further comprising:
a housing configured to accommodate the first compression part and the second compression part.

6. The supercharger of claim 5, wherein the housing comprises:
a first inlet port through which the outside air is supplied to the first compression part;
a first outlet port through which the air compressed by the first compression part is discharged;
a second inlet port through which the outside air is supplied to the second compression part; and
a second outlet port through which the air compressed by the second compression part is discharged.

7. The supercharger of claim 6, wherein the first valve module comprises:
a first valve body defining a first inner flow path;
a first flow path port communicating with the first inner flow path and connected to the first outlet port;
a first flow path control valve configured to selectively open or close the first inner flow path;
a second flow path port communicating with the first inner flow path and connected to the power source;
a third flow path port disposed between the second flow path port and the first flow path control valve, communicating with the first inner flow path, and connected to the second outlet port;
a second flow path control valve configured to selectively open or close the third flow path port;
a fourth flow path port communicating with the first inner flow path and connected to the second inlet port; and
a third flow path control valve configured to selectively open or close the fourth flow path port.

8. The supercharger of claim 5, further comprising:
an inverter disposed in the housing and configured to control an operation of the first compression part and an operation of the second compression part.

9. The supercharger of claim 8, wherein the first compression part and the second compression part are disposed at opposite sides of the inverter.

10. The supercharger of claim 1, wherein the first compression part comprises:
a first driving source; and
a first impeller configured to compress the outside air by being rotated by the first driving source, and
wherein the second compression part comprises:
a second driving source; and
a second impeller configured to compress the outside air by being rotated by the second driving source.

11. The supercharger of claim 10, wherein the first driving source comprises:
a first stator; and
a first rotor configured to be rotated by an electrical interaction with the first stator, and
wherein the second driving source comprises:
a second stator; and
a second rotor configured to be rotated by an electrical interaction with the second stator.

12. The supercharger of claim 1, further comprising:
a second valve module configured to selectively shut off a flow of the air compressed by the first compression part into the second compression part or a flow of the outside air into the second compression part; and
a housing configured to accommodate the first compression part and the second compression part;
wherein the first compression part comprises:
a first driving source; and
a first impeller configured to compress the outside air by being rotated by the first driving source, and
wherein the second compression part comprises:
a second driving source; and
a second impeller configured to compress the outside air by being rotated by the second driving source.

* * * * *